United States Patent [19]
Mason

[11] 3,745,394
[45] July 10, 1973

[54] ELECTRICAL INSULATORS FOR SLOTTED MAGNETIC CORES

[75] Inventor: Lowell M. Mason, Fort Wayne, Ind.

[73] Assignee: General Electric Company, Fort Wayne, Ind.

[22] Filed: Dec. 7, 1971

[21] Appl. No.: 205,484

Related U.S. Application Data

[62] Division of Ser. No. 845,996, July 30, 1969, which is a division of Ser. No. 653,983, July 17, 1967, Pat. No. 3,514,836.

[52] U.S. Cl. .............................................. 310/215
[51] Int. Cl. ............................................ H02k 3/36
[58] Field of Search........................ 310/214, 215, 45

[56] References Cited
UNITED STATES PATENTS
3,210,583   10/1965   Profitt et al.......................... 310/215
2,473,332   6/1949   England.......................... 310/215 X

*Primary Examiner*—D. F. Duggan
*Attorney*—John M. Stoudt, Ralph E. Krisher, Jr. et al.

[57] ABSTRACT

Electrical insulators, for example, slot liners, are produced from an elongated continuous strip of dielectric material in the slots of a magnetic core. Individual pieces of dielectric strip material having different preselected sizes and desired configurations are then produced; and may have laterally extending portions and an intermediate axially extending bight portion at one end thereby permitting shorter coils to be used in the magnetic core while also allowing the coils to take a gradual bend adjacent the core, next to the bight portion, which tends to prevent damage to the coils.

3 Claims, 16 Drawing Figures

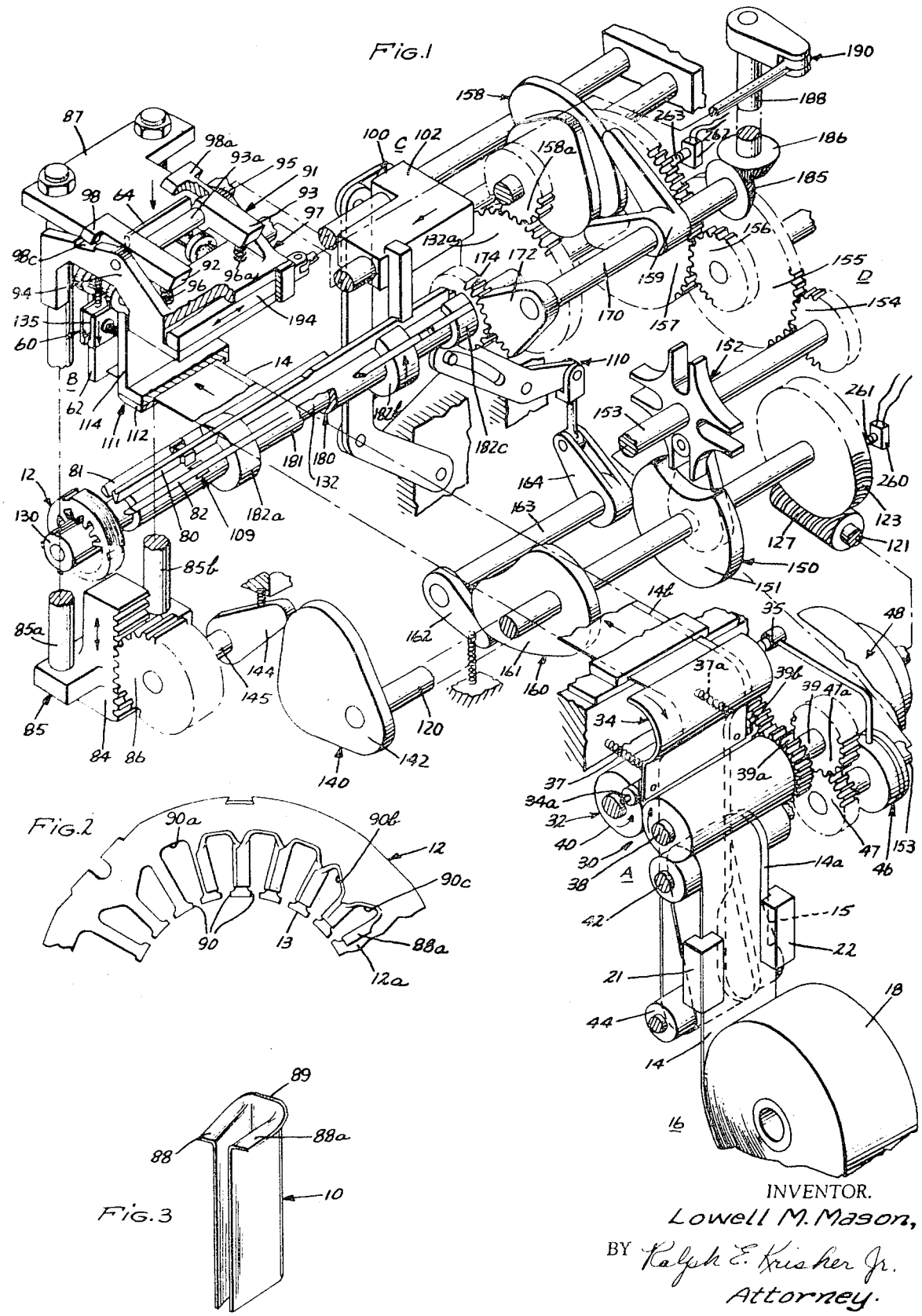

PATENTED JUL 10 1973 3,745,394

INVENTOR.
Lowell M. Mason,
BY Ralph E. Krisher Jr.
Attorney.

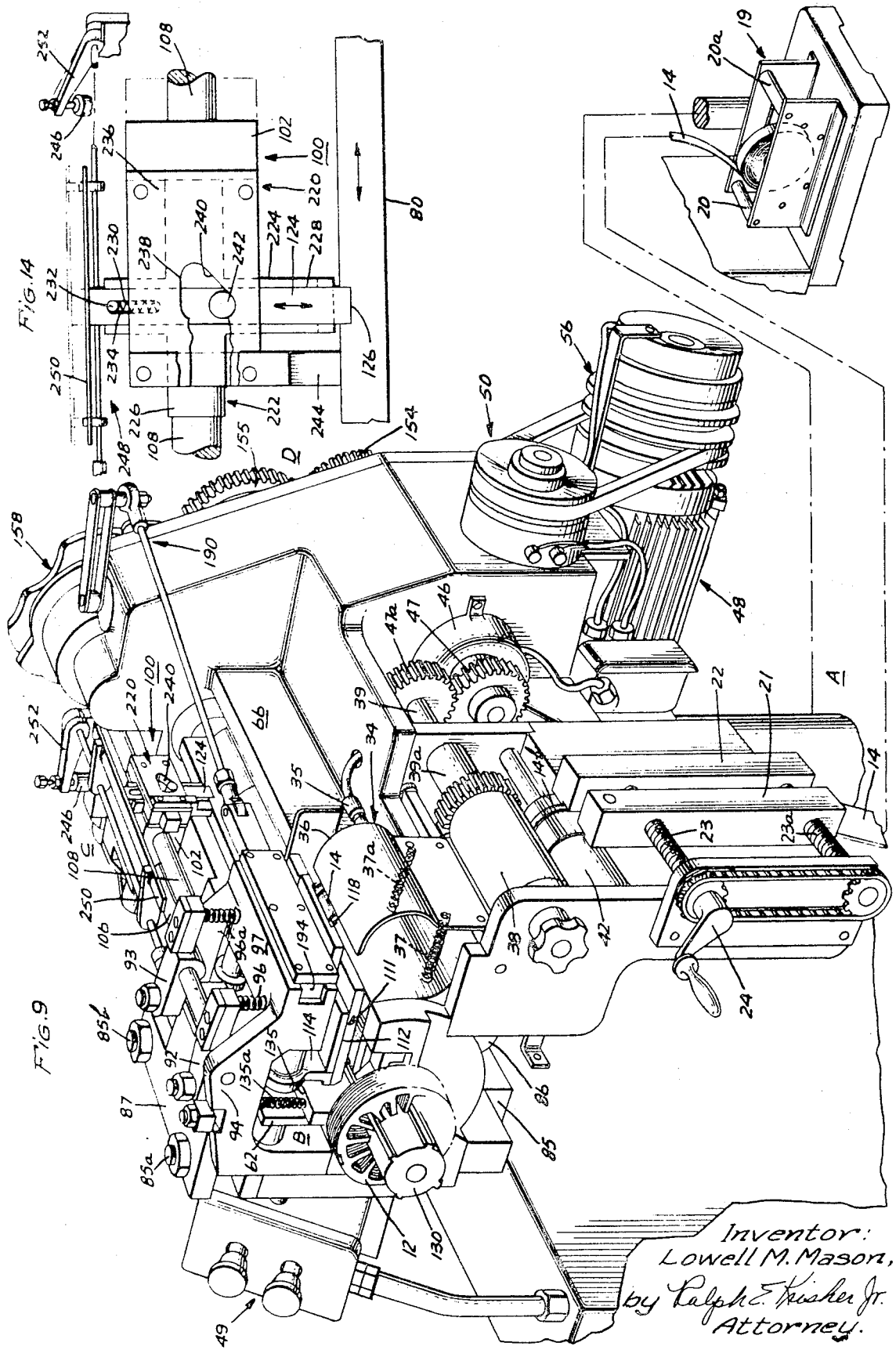

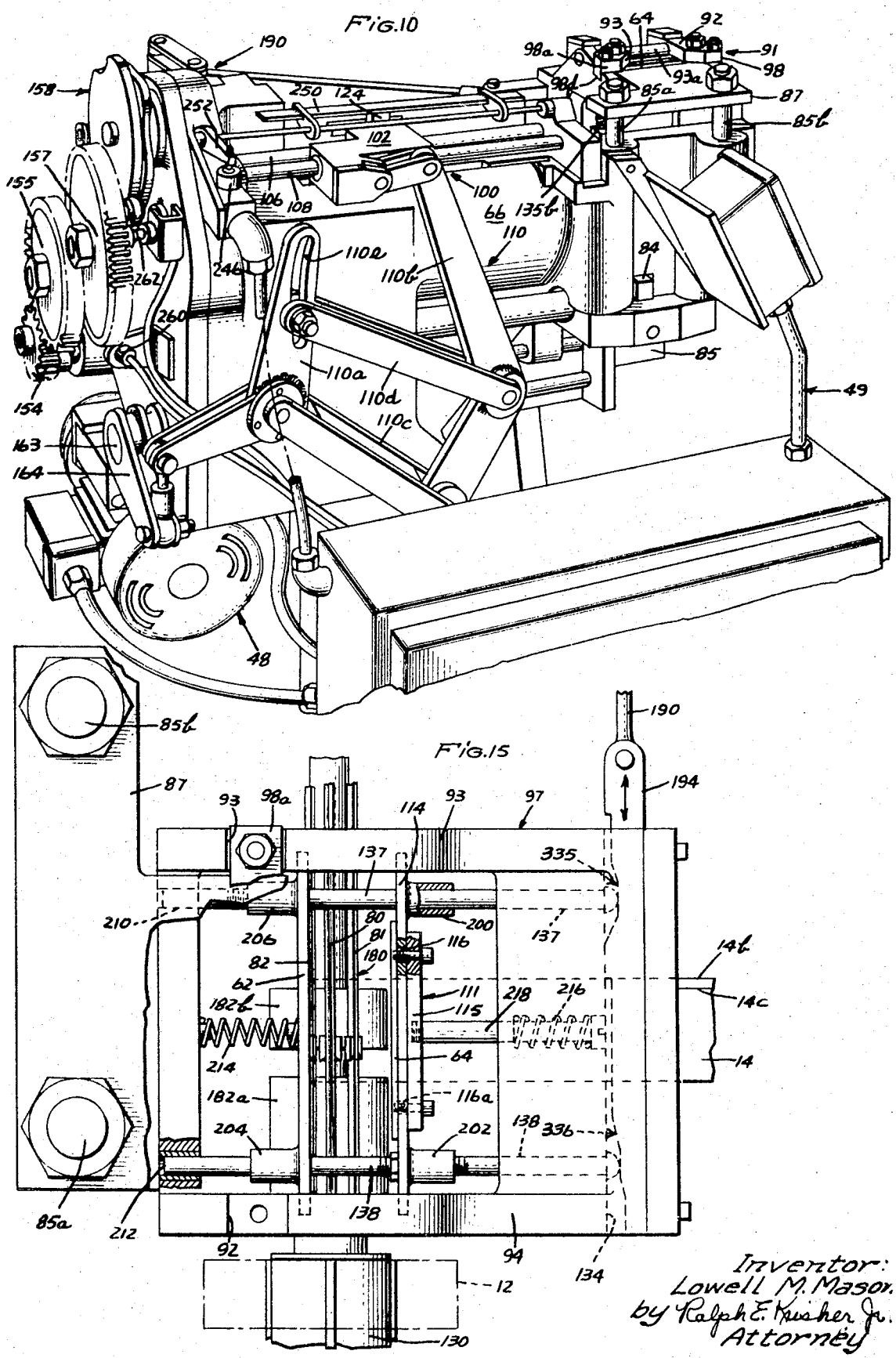

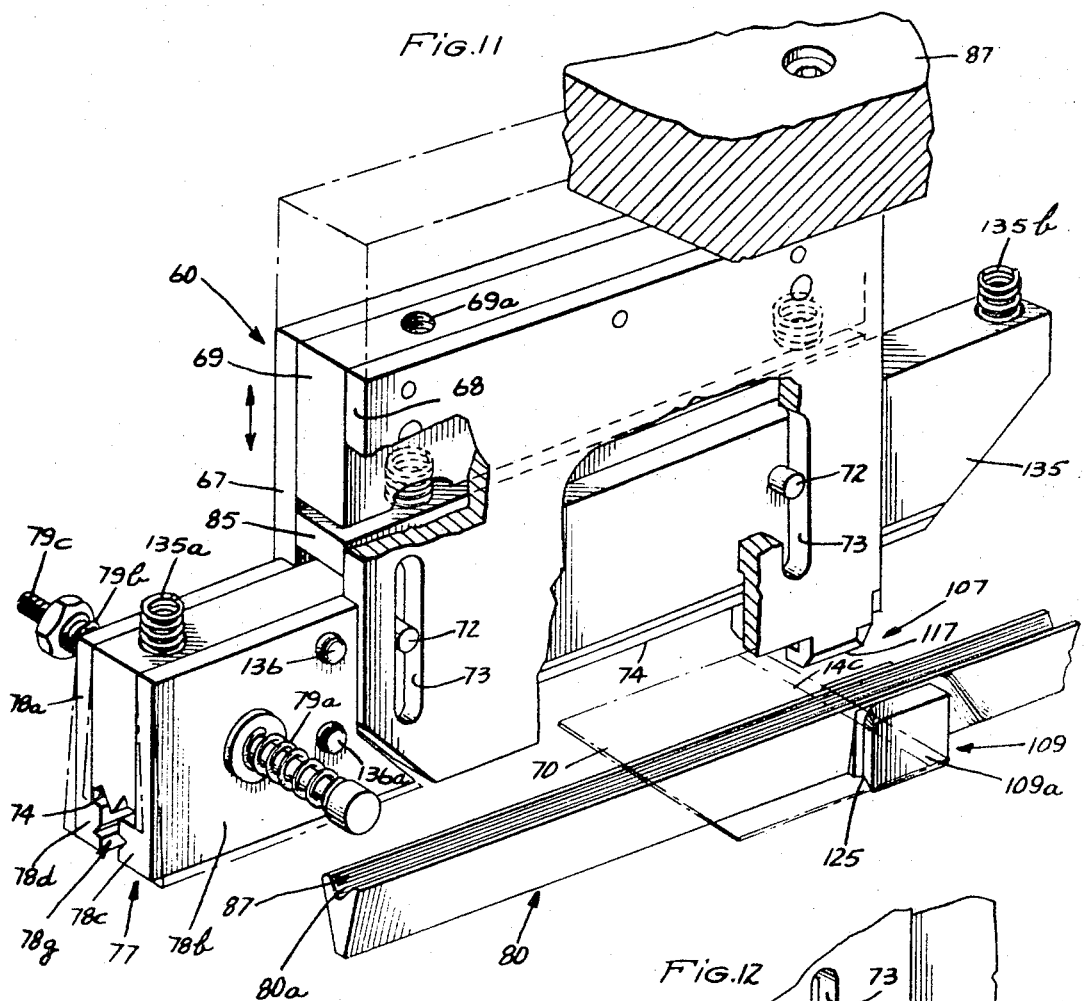
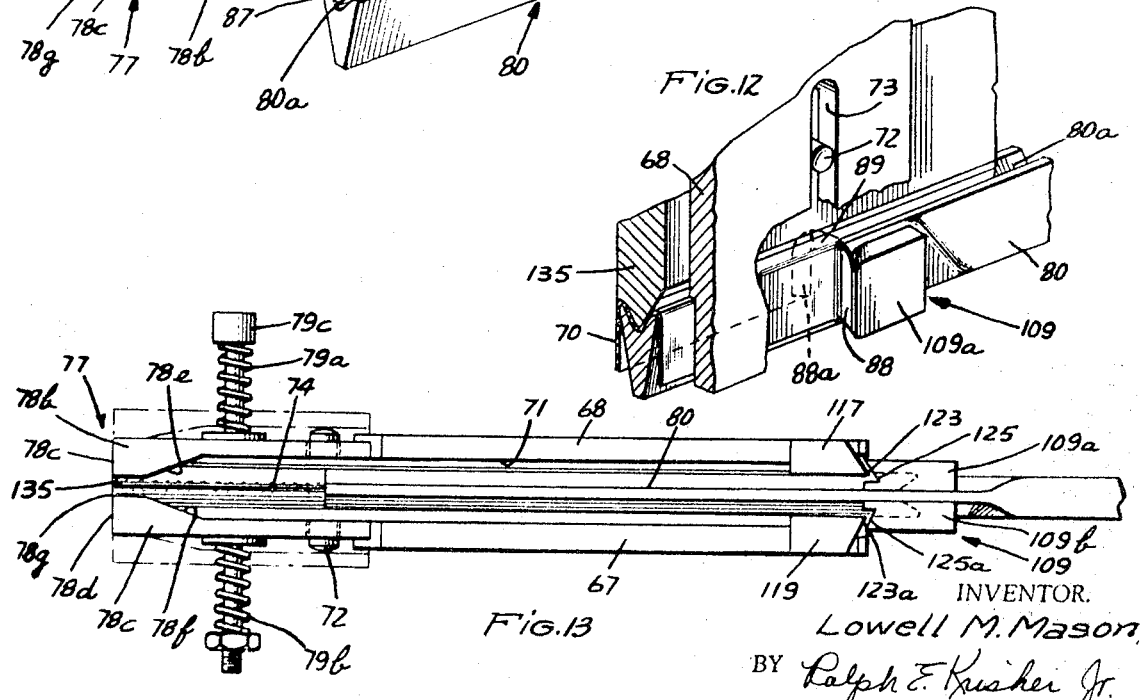

ELECTRICAL INSULATORS FOR SLOTTED MAGNETIC CORES

CROSS-REFERENCE TO RELATED APPLICATIONS

This application is a division of my co-pending application Ser. No. 845,996 filed July 30, 1969, which in turn is a division of my then co-pending application Ser. No. 653,983 filed July 17, 1967, which issued as U.S. Pat. No. 3,514,836 on June 2, 1970.

BACKGROUND OF THE INVENTION

The present invention relates to electrical insulators, such as slot liners, for magnetic cores. More particularly, the present invention relates to a novel slot liner for electrically insulating electric coils from the core.

Magnetic cores, such as those formed of a stack of laminations used in electric motors, generators, transformers, and the like, generally require some type of electric insulation between certain core surfaces and electrical coils carried by the cores. Taking a conventional laminated stator core, for example, electrical coils are carried in slots which extend axially through the core and have entrances in communication with a central bore adapted to receive a rotatable member or rotor of the motor. These electrical coils are normally covered with a layer of insulating material themselves, but generally speaking additional insulation is usually required in the core slots and at one or both core end faces to prevent the electrical coils from shorting out or being grounded against the core during excitation of the coils. Such additional insulation is especially desirable should the coil insulation be bruised and cracked which is a particular problem in the vicinity of the usually sharp edges of the slots at the core end faces. One desirable approach for insulating the slots concerns the employment of slot liners fabricated from suitable dielectric strip material which are inserted into the core slots either manually or with the use of inserting equipment.

One problem with the slot liner approach, prior to the present invention, related to the difficulty in attaining the desired accurate placement of the then available liners with a great degree of consistency on a mass production basis. In particular, where a core stack height was unusually long, for example, over 2 inches, liners have heretofore had a tendency to become twisted in the slots or otherwise misaligned during their installation. This in turn could cause exposure of parts of the slot walls to the coils at least in the vicinity of the bore entrances, ultimately resulting in engagement between some coil turns with the slot walls. In addition, even for cores having heights 2 inches and below, slot liners heretofore could have become misaligned as a result of obstructions occurring in the slots, e.g., because of laminations which were not properly aligned in the stack. Unacceptable insulated cores could therefore be produced either as a result of misalignment of the liners in the slots; improperly aligned laminations that result in a defective core and that may also cause damage to installed liners; or both. This can be particularly time consuming and costly when discovered only after all of the liners for a given core had already been placed in the slots.

Heretofore, another difficulty associated with the satisfactory use of slot liners has resulted from the previous lack of slot liners that could be developed in core slots in a versatile, inexpensive, and yet expeditious manner. By way of illustration, in view of the great variety of core and core slot sizes and shapes in use today, there is a need for slot liners having differing configurations, including shape and size, that may be produced for cores of different configurations with a minimum modification required in the practice of the approach as well as of the down-time of equipment that might be employed in carrying out such approach.

Consequently, it is quite desirable that insulators, such as slot liners, be furnished which can be useful in overcoming these problems and be accurately placed in the slots of a core with a high degree of consistency; even where slot liners in the same core have differing configurations. It is also desirable that the slot liners lend themselves to the detection of defects as early as possible before all of the slot liners have been installed into position on a core. The insulators should be inherently inexpensive and yet, e.g., in the case of slot liners, be producible and useful for cores and slots having differing sizes and shapes. Other desirable features includes dielectric slot liners susceptible of being developed to have precise dimensions and shapes to facilitate accurate placement in the core slots as well as slot liners having a variety of cuffs adapted to prevent engagement of coils with the edges of the slots. In this regard, slot liners that enable shorter electrical coils to be used in a given size core, while also permitting coil end turns which extend beyond the edges of the slots to be pressed into a desired position relative to the core without a sharp bend occurring at the slot edges, are also quite beneficial.

It is, therefore, a primary object of the present invention to provide new and improved electrical insulators for the slots of magnetic cores.

It is a more specific object of the present invention to provide improved slot liners which may be useful for overcoming problems and providing at least some of the above-mentioned desirable features.

It is another object of the present invention to provide improved precisely dimensioned liners for variously shaped slots of graded slot magnetic cores, the liners being susceptible of accurate placement in the core slots.

It is yet another object of the invention to provide improved slot insulators which permit a reduction of conductor end turn height in stator coils on a magnetic core and thus permit savings in material and better performance characteristics of a motor.

SUMMARY OF THE INVENTION

In accordance with the invention, in one form thereof, electrical insulators, for instance, slot liners, are produced from an elongated continuous strip of electrically insulating material (e.g., dielectric material) in the slots of a magnetic core. A predetermined quantity of the strip material is fed from a supply station to a strip accumulator and a first portion of the predetermined quantity is urged by the accumulator into engagement with a stop means in a sizing and forming station. At the sizing and forming station individual pieces of strip material having different preselected sizes are formed. Strip pieces having desired configurations are then produced by being placed into engagement with preselected forming tools supported generally adjacent the sizing and forming station. The individual strip pieces are then transferred into predetermined slots of the magnetic core by inserting a given forming tool with a strip piece positioned thereon into a predetermined core slot.

In the production of individual strip pieces, a lateral bend is preferably established along at least one end region of the individual pieces to provide cuff-like portions thereon. A portion of the individual strip pieces is provided to permit holding such portion externally of the core on a given forming tool and releasing the pieces after at least a portion thereof has been introduced into the core slots.

Insulators exemplifying the invention may be provided for cores having differently shaped slots, having bores in excess of 5 inches in diameter, and stack heights in excess of 9 or more inches. Furthermore, electrical insulators (slot liners in the illustrated exemplification) are accurately dimensioned and may be placed directly into core slots quickly. Moreover, exemplified slot liners may have different desired cuff styles. Exemplified slot liners have flat lateral extensions or cuff-like portions and an axially extending bight portion or collar between the cuff-like portions. The collar permits a section of coil carried in the magnetic core to take a gradual bend thereby to prevent damage to the coil and the extension portions permit the use of shorter coils in the magnetic core. The insulator includes connector portions joining the extension and bight portions together so as to tend to maintain the bight portion in the axial direction.

The subject matter which I regard as my invention is set forth in the appended claims. The invention itself, however, along with further objects and advantages thereof will be understood by referring to the following description taken in connection with the accompanying drawings.

BRIEF DESCRIPTION OF THE DRAWINGS

FIG. 1 is a schematic perspective view of one form of apparatus that may be used to produce and place electrical insulators, illustrated as slot liners, and embodying my invention in one form thereof;

FIG. 2 is a partial elevational view of a core having had exemplified insulating slot liners produced therein;

FIG. 3 is a perspective view of one type of slot liner embodying the present invention;

FIGS. 4-8 inclusive depict, partially in schematic form, the preferred manner in which the slot liners of FIGS. 2 and 3 having desired configurations may be developed in axially extending slots of a magnetic core, wherein:

FIG. 4 is a schematic elevational view illustrating, in simplified form, one way in which dielectric strip material may be fed into an accumulating and feeding device;

FIG. 5 is a simplified schematic elevational view similar to that of FIG. 4 showing the dielectric strip material setting or cocking the accumulating and feeding device as it is being fed into engagement with a stop plate at a sizing and forming station;

FIG. 6 is a view similar to that of FIG. 5 showing the movement of the cutting blade and forming mechanism in relation to a forming tool as a piece of dielectric strip material is being placed onto the forming tool in order to produce a slot liner;

FIG. 7 is a simplified partially schematic elevational side view revealing a slot liner or shaped strip piece being carried on the forming tool as it is being inserted axially into a preselected slot of a stator core;

FIG. 8 is a view similar to that of FIGS. 4-6 showing the strip material being fed into the sizing and forming station when the cutting blade is raised preparatory to the production of another slot liner;

FIG. 9 is a front perspective view of the apparatus capable of producing insulators embodying the invention;

FIG. 10 is a partial rear perspective view of the apparatus illustrated in FIG. 9;

FIG. 11 is a partial perspective view of a forming tool or blade, strip piece and strip placing mechanism showing the manner in which the placing mechanism cooperates with the forming tool to shape a strip piece and produce flat, cuff-like extensions thereon;

FIG. 12 is a partial perspective view of the forming tool and strip piece of the strip placing mechanism shown in FIG. 11 further illustrating how the strip piece is shaped and the extensions produced;

FIG. 13 is a bottom plan view of the strip placing mechanism and forming tool shown in FIGS. 11 and 12;

FIG. 14 is a partial elevational view of the carriage that carries the forming tools into the core slots, showing a safety cut-off feature for stopping the apparatus if a forming tool should meet an obstruction in a core slot;

FIG. 15 is a top plan view, partially broken away of the sizing and forming station showing various details of the stop plate, cutting plate, and forming tools.

DESCRIPTION OF THE PREFERRED EMBODIMENT

General Description of Method

Figure 4:
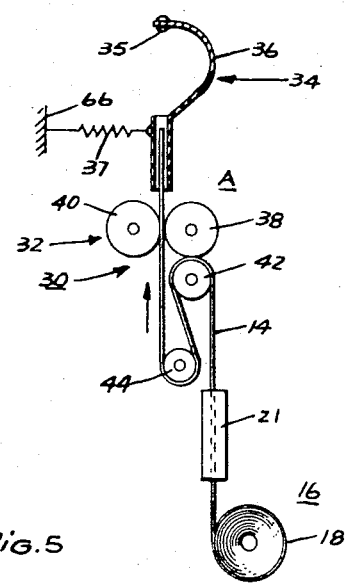

Turning now to a consideration of the drawings in more detail, FIGS. 1-8 inclusive show, schematically, operations that may be followed to produce electrical insulators, in the form of slot liners, that embody the invention. For the purpose of explanation, preferred exemplifications of slot liners will be described in connection with one form of apparatus that may be utilized to produce such slot liners.

More specifically, electrical insulators in the form of slot liners 10 are developed for an inductive device such as a magnetic stator core 12 from electrically insulating or dielectric material 14 in elongated strip form. The core 12 has a bore 13 and plurality of axially extending slots 90 opening on the bore 13. The strip material 14 is fed from a storage or supply station 16 by a feeding mechanism generally denoted by numeral 30. The feeding step includes supplying a predetermined quantity of the strip material 14 by supply means 32 to a strip accumulating and urging or feeding device 34 at a material feed station A. A portion of the preselected quantity is urged toward a stop plate 62 at a first position in a sizing and forming station B as the accumulating and urging device 34 is normally biased toward the stop plate 62 by a biasing means or springs 37 and 37a. The strip material 14 acts to cock or rotate the device 34 away from the stop plate 62 by overcoming the force of springs 37 and 37a (compare FIGS. 4 and 5). Strip pieces 70 having desired sizes are then formed as a cutting blade 64, located at a second position in the sizing and forming station B, severs the strip material 14 (see FIG. 6).

After the strip pieces 70 are formed, they are placed into engagement with a forming tool or blade 80 that is supported generally adjacent the sizing and forming station B between the first and second positions with the tool 80 having a cross-sectional contour generally corresponding to the shape of a slot of a magnetic core 12. In this manner, strip pieces having a desired configuration are produced, with a placing means or mechanism generally denoted by numeral 60 being used to effect the placing operation. In addition, as the strip pieces are placed upon the tool 80, a lateral bend is established along at least one end region 14b to provide the slot liner 10 with cuff-like portions or lateral extensions 88, 88a and a connecting or bight portion 89.

Figure 7:
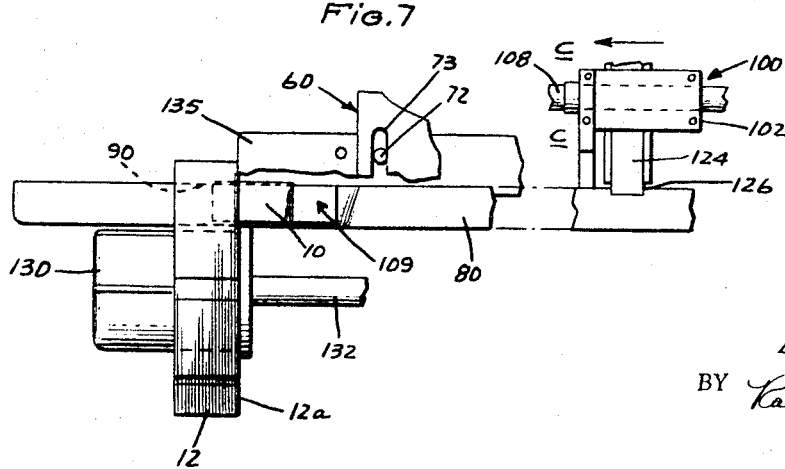

The individual strip pieces are selectively transferred and distributed into preselected slots 90 of the core 12 by inserting the forming tool 80 with the shaped strip piece 70 positioned thereon into the preselected slots (see FIG. 7). As the forming tool 80 carries the slot liner 70 into the preselected slot 90, the strip piece 70 is held or retained on the tool 80 by a holding means including a pressure bar 135 (see FIGS. 6 and 7) externally of the core 12.

As will be appreciated from a review of FIGS. 1 and 9, the strip material 14 is supplied to the accumulating and urging device 34 by a pair of power driven supply rolls 38 and 40 and a pair of idler rolls 42 and 44, the supply rolls being driven by a shaft 153 which operates through a suitable clutch 50 which is controlled by a proximity pickup or switch 35 (see, e.g., FIG. 9). Thus, the supply rolls 38 and 40 are periodically energized to supply a predetermined amount of strip material 14 into the strip accumulating and feeding means 34 which in turn urges a portion of the predetermined amount of strip material into the sizing and forming station B.

As the accumulating and feeding device 34 urges the strip material 14 into engagement with the stop plate 62, the length of the piece 70 of strip material that is cut will only depend upon the accurate positioning of the stop plate 62 and the cutting blade 64, which in the exemplification is very accurately controlled by a bar cam 194. This permits the strip pieces 70 to be cut to extremely close tolerances, while in addition providing a relatively simple feeding mechanism. On the other hand, if positively driven feed rolls were used to feed the strip into the sizing and forming station B, for example, there would have to be a complex gearing arrangement to accurately drive and stop the feed rolls, and it would be rather difficult to vary the length of strip being fed into the sizing and forming mechanism.

An inserting mechanism generally denoted by reference numeral 100 is provided at an inserting station C (see FIGS. 1 and 7) for inserting the tool 80 with a shaped strip piece or slot liner 10 thereon into a preselected core slot 90. The inserting mechanism 100 is in the form of a carriage 102 movable between rear and forward positions by a linkage 110 operatively connected to a master control or drive shaft 120 which is continuously driven by the drive motor 48 acting through an output shaft 121, worm gear 127 and spur gear 123. The carriage 102 includes a connecting block or leg 124 engaged in a slot 126 in the forming tool 80. When the carriage 102 is moved forwardly, it carries the forming tool 80 forwardly into the magnetic core 12. The magnetic core 12, shown schematically in FIG. 1 and in greater detail in FIG. 2 is mounted upon a mandrel 130 located axially adjacent the sizing and forming station B and retained thereon by suitable frictional retaining means.

As the carriage moves from its rear position to its forward position in response to actuation by the master control shaft 120 through the linkage 110, the forming tool 80 is carried axially into a core slot 90 which is in alignment therewith. By this movement of the forming tool 80, a slot liner 10, formed from the piece 70 of electrically insulating strip material 14, is carried into the aligned slot, while the pressure bar 135 (see FIGS. 7 and 12) retains the slot liner 10 on the forming blade 80. Thus, it will be understood that in accordance with the exemplified method, the shaped slot liners 10 may be inserted directly into a preselected slot 90 of a magnetic core 12 with the shape of the slot liner being maintained during the insertion and with the slot liner traveling directly into the core slot so as to reduce the possibility of its being improperly positioned in the slot due to any twisting action or the like.

Referring again specifically to FIGS. 2 and 3, I have shown a stator core 12 which has had exemplified slot liners 10 produced or developed therein together with one type of exemplified slot liner 10.

The slot liner 10 has flat lateral extensions or cuff-like portions 88 and 88a which, as will be seen, lie flat against an end face 12a of the stator core 12 when inserted therein. In addition, an intermediate portion, such as bight 89, extends axially between the extensions. The lateral extensions 88 and 88a provide insulation between the core 12 and electrical coils (not illustrated) at the core face 12a and at the slot edges or corners. The lateral extensions 88 and 88a also permit the end turn portions of the electrical coils to be relatively shorter than is possible when the usual cuffs are used, as the usual cuffs extend beyond the faces of the stator core. This will therefore result in savings due to the shorter coils. The axially extending collar 89 is useful in that it permits the coils to be pressed back toward the face 12a while causing the bend in the coils to be gradual rather than sharp. Hence, this tends to prevent damage to the coil insulation at the bends, and adds rigidity to the coil and core assembly. The present apparatus is also capable of producing cuffs having the usual axial rather than the novel flat extensions, as will be explained hereinafter.

From the foregoing brief description, taken in conjunction with the schematic illustration of FIG. 1 and the illustrations of FIGS. 2–8, it will be appreciated that the illustrated apparatus has four operating stations A–D, each of which is controlled through the master control or drive shaft 120, and which therefore operate in synchronism for developing slot liners 10 in the axially extending slots 90 of a magnetic device such as a stator core 12. While the mechanisms at each of these stations have been described in a general way, a further detailed explanation of the synchronizing function or operation of the master control shaft 120 as well as of the mechanisms at each station is presented below in appropriate subdivisions of the specification.

Master Control For Synchronizing Apparatus Mechanisms

In order to continuously form slot liners of different configurations and place them in various preselected slots of the magnetic core 12, the master drive shaft 120 is provided with first, second and third driving means denoted 140, 150 and 160 respectively. The first driving means 140 takes the form of a cam 142 mounted on the shaft 120 for rotation therewith. A cam follower 144, mounted on a pinion shaft 145, is in engagement with the cam 142. The master control shaft 120 rotates continuously during the operation of the apparatus as the motor 48 is energized by suitable electrical apparatus 49, and due to the configuration of the cam 142, the pinion shaft 145 rotates in a first direction, dwells or remains stationary, and then rotates in the opposite direction during each revolution of the cam 142 with the master control shaft 120. This motion is illustrated graphically in FIG. 16.

Figure 16:
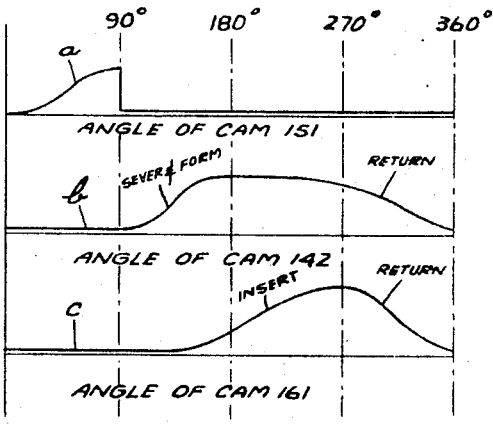
FIG. 16 is a cam layout diagram showing the movement of the various mechanisms of the FIG. 9 apparatus and in relation to rotation of the driving means carried by a master control shaft.

The pinion shaft has a pinion gear 86 mounted interconnected with a rack section 84 which moves upwardly, remains stationary and then moves downwardly during each cycle or rotation of the cam 142 and master control shaft 120 as indicated by curve b in FIG. 16. This arrangement causes the cutting blade 64 and the placing mechanism 60 to rise, dwell and fall during each cycle of the master control shaft 120. Thus, during each cycle, one strip piece 70 is formed by being severed by blade 64 and shaped into a desired configuration or slot liner 10 by the placing mechanism 60. In order to achieve continuous operation, the accumulating and urging device 34 feeds the end of the strip material 14 up to the stop plate 62 each time the rack section 84 moves upwardly, moving the cutting blade 64 out of the path of the strip material 14 (see, e.g., FIG. 8).

To present one of several forming blades (80, 81 and 82 in the exemplification, as shown in FIG. 1) in position to receive a piece 70 of electrically insulating strip material thereon during each cycle, the second driving means 150 on the master control shaft is a cam 151 with which a Geneva type cam follower arrangement 152 is operatively associated. The cam follower arrangement 152 is located on a shaft 153 which is in turn connected through a plurality of spur gears 154, 155, 156 and 157 and a second cam 158 and cam follower arrangement 159 to an oscillatable shaft 170 having a gear segment 172 thereon. The gear segment 172 is in engagement with a spur gear 174 that is connected to a rotatable forming tool or blade assembly 180. The tool assembly 180 is mounted upon but not movable with a shaft 132 and as the gear segment oscillates, the tool assembly 180 will be moved to one of three positions, corresponding to an upward or aligned disposition of one of the three forming tools 80, 81, 82 with respect to a core slot 90 and the placing mechanism 60. It will be seen that the tool assembly 180 includes a hollow tubular member 181 rotatably mounted on shaft 132 and having the spur gear 174 mounted thereto. The tubular member carries a plurality of slotted annular mounting rings 182a, 182b and 182c in which the three forming tools 80, 81 and 82 are respectively slidably disposed.

As the exemplified apparatus is shown for use with a stator core 12 having three different slot configurations or differently shaped slots 90a, 90b, 90c (see FIG. 2), each forming tool has a different configuration or contour in cross secton generally corresponding to the shape of a slot (viz., tools 80, 81 and 82 correspond respectively to slots 90a, 90b and 90c). However, as will become apparent, the present apparatus is useful for producing slot liners in stator cores having up to nine or more differently shaped slots.

It is, of course, necessary to rotate the stator core 12 to present succeeding of its slots 90 in axial alignment with a given one of the forming tools for receiving a slot liner therein, and hence as the tool assembly 180 is rotated by the gear segment 172 on shaft 170 in response to oscillation imparted to the shaft 170 through cam follower 159 and cam 158 and gears 132a on shaft 132 and 158a on shaft 158b, the stator holder or mandrel 130 is also rotated. Furthermore, in order to synchronize the movements of the tool assembly 180 and the core 12 without an unduly complex mechanism, the mandrel 130 is mounted on the end of the rotatable shaft 132 which is driven through the same gear train (i.e., spur gears 154, 155, 156 and 157) as is the aforementioned oscillatable shaft 170, at an indexing station D. These two shafts 132 and 170 thereby act in synchronism, and as the tool assembly 180 is rotated for disposing a given preselected tool of the forming tools adjacent the slot liner placing mechanism 60, the shaft 132 is rotated through an angle represented by the formula 360/(number of slots in the core) to present each preselected slot 90 in turn for receiving a slot liner 10 therein.

It will be understood that as each differently shaped forming tool 80, 81, 82 is disposed adjacent the placing mechanism 60 in position to receive a piece of dielectric strip 70, it is necessary that the strip piece that is cut be of the proper length, as differently shaped slots have different inner peripheral lengths and hence require different lengths of slot liner. It is extremely important that the developed length of each slot liner be accurate, as a slot liner that is too short may permit an electrical coil carried in the slot to short against the bare wall of the slot, and a slot liner that is too long will simply not fit within the slot. Accordingly, to accurately control the developed length of each strip piece 70 in a relatively simple yet extremely effective manner, the oscillatable shaft 170 which controls the position of the forming tool assembly 180 also is connected through a pair of spur gears 185 and 186, a vertical shaft 188 and a linkage 190 to the bar cam 194 for controlling the relative positions of the stop plate 62 and the cutting blade 64. The bar cam has two sets of cam surfaces 335 and 336 thereon (see in particular FIG. 15) which are associated with cam followers 137 and 138 respectively. The followers 137 and 138 function in a manner to be discussed below to change the distance between the stop plate 62 and the cutting blade 64.

The third driving means 160 on the master control shaft 120 is a third cam 161 associated with a cam follower 162 on an idler shaft 163 which in turn has an arm 164 connected to the aforementioned linkage 110, the linkage 110 being, of course, connected in turn to the carriage 102. As the master control shaft 120 rotates, the third cam 161 acts through the linkage 110 to move the carriage 102 between its rear and forward positions during each cycle, in synchronism with the oscillatable shaft 170, the rotating shaft 132, and the bar cam 194. This motion will be seen in FIG. 16 and curve c. Hence, it will be apparent by this discussion of the functioning of the master control shaft 120 and its cooperation with the various mechanisms of the exemplified apparatus, that the various mechanisms operate automatically and in synchronism to produce slot liners 10 in the various slots 90 of a stator core 12.

Material Feed Station (A)

Referring now to the schematic illustration of FIGS. 1 and to FIGS. 4–6, 8 and 9, it will be seen that the material used to form slot liners 10 in the illustrated exemplification is elongated strip material 14 formed in a roll 18 which is carried in a roll support cabinet 19. The material used in the exemplification is a terephthalate polyester, and may, for example, be of the type known in the trade as "Mylar." This material is electrically insulating as well as being flexible and relatively easily shaped, and it has been found to be satisfactory for the present use. However, it will be appreciated that other suitable electrically insulating material, such as treated paper or the like, may be used.

The roll 18 of elongated electrically insulating strip material 14 is mounted between several rolls 20, 20a, etc. in the cabinet 14. When the present apparatus is to be started, an end of the strip 14 is threaded between a pair of guide members 21, 22 one of which (21 in the exemplification) is adjustably mounted on a pair of threaded shafts 23, 23a to compensate for different widths of strip material. In order to accommodate stators having different stack heights it will obviously be necessary to use different widths of strip material. Hence, by turning the handle 24 the movable guide member 21 may be moved toward or away from the fixed guide member 22 to accommodate these different widths of strip material.

The strip material 14 is fed or threaded past the guide members 21 and 22, and in a serpentine path over the first and second idler or guide rolls 42 and 44 and between the pair of power driven supply rolls 38 and 40. When the end of the strip 14 is between the two supply rolls 38 and 40, the drive motor 48 is started. The first supply roll 38 is driven from the shaft 153, being connected thereto through an electromagnetic clutch 46, gears 47, 47a, and rotatable shaft 39. The shaft 39 has a gear 39a thereon which in turn mates with a gear 39b on the supply roll 40, wherein the supply rolls 38 and 40 are rotated in opposite directions to pull the strip material 14 from the material supply roll 18 when the electromagnetic clutch is energized and the shaft 39 rotates. Of course, as explained above, the shaft 153 rotates 90° per revolution of the master control shaft 120 during the operation of the present apparatus. However, the supply rolls 38 and 40 are only periodically driven through the clutch 46 as will be explained below.

As the strip material 14 is pulled past the guide members 21, 22, one lateral edge 14a of the strip material is turned inwardly upon itself by means of a spiral groove 15 extending along the inner edge of the guide member 22. This is done in order to provide a crease 14b running along the lateral edge 14a of the strip material 14, which is permanently impressed as the strip material 14 travels between the pinching guide roll 42 and supply roll 38. The supply roll 38 thus has two functions, to supply the strip material 14 into the accumulating and feeding device 34, acting with supply roll 40, and to impress the crease at 14b, acting with idler or guide roll 42. This longitudinally extending crease 14b is necessary in order to form the flat extensions 88 and 88a previously described, at the sizing and forming station B. In the exemplification, the lateral edge 14b is unfolded before the strip material is fed upwardly between the supply rolls 38 and 40 for leaving the crease 14b, when it is desired to form the illustrated flat extensions 88, 88a. If, however, axially extending cuffs are to be formed, the lateral edge 14a is left folded as the strip material 14 is fed upwardly between the supply rolls 38 and 40. In this manner, it is possible with the exemplified apparatus to produce slot liners having several varieties of cuffs, i.e., cuff-like extensions 88, 88a or axial cuffs. In addition, a cuff may be produced on the other end of the slot liner 10 by providing a spiral groove in the guide member 21, if desired.

Figure 5:
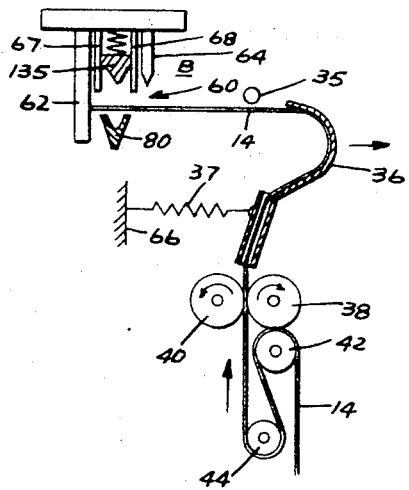
Figure 6:
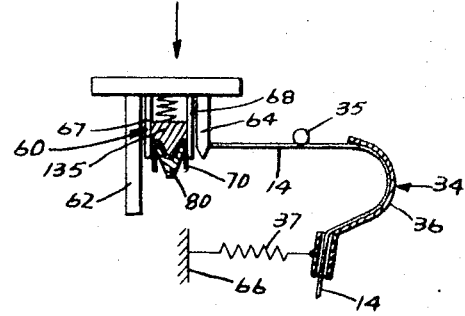

With the accumulating and feeding device 34 held in a forward position by the coil springs 37 and 37a as the apparatus is being started (see FIG. 4), a proximity switch 35 operates to energize the electromagnetic clutch 46, and hence causes the supply rolls 38, 40 to turn. As the supply rolls 38 and 40 turn, the strip material 14 is fed upwardly into the accumulating and feeding or urging device 34 in a first direction, following the curved section 36 of the device 34 and taking a generally right angle bend therethrough. The forward end of the strip material 14 is thus fed into abutting engagement with the stop plate 62. As the strip material 14 engages the stop plate with the supply rolls 38, 40 still turning, a compressive force is built up in the strip material 14, which force is transmitted to the accumulating and feeding device 34 at the curved section 36. The flexible strip material 14, acting at the curved section 36 due to a "column" effect, is rigid enough to force the feeding device 34 rearwardly about its mounting on a rotatable bar 34a as the compression force in the strip material 14 overcomes the force of springs 37 and 37a, and the accumulating and feeding device is cocked or set as shown in FIG. 5, tensioning the spring 37. When the accumulating and feed device is moved out of engagement with the proximity switch 35 after a predetermined quantity of strip material 14 is supplied thereto, the electromagnetic clutch 46 is deenergized, thereby shutting off the supply rolls 38, 40. It will be appreciated that the tension springs 37, 37a now urge a portion of the predetermined amount of strip material 14 that was fed into the accumulating and feeding device 34 towards the sizing and forming station B into engagement with the plate 62, or a double cuff may be produced by feeding two strips of material 14 into station B simultaneously.

Figure 8:
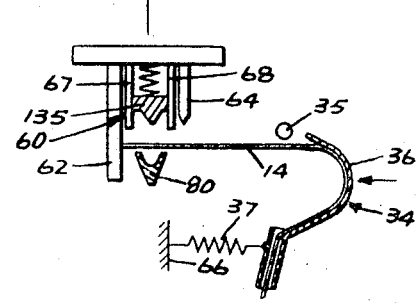

The exemplified accumulating and feeding device 34 of the material feed mechanism 30, as shown in the exemplification is extremely important to the operation of the present apparatus as it enables a precisely controlled amount of material to be fed into the sizing and forming station in such a way as to eliminate the complex mechanism which would be otherwise necessary if the strip material were fed therein directly from power driven supply rolls. It will be appreciated that with the exemplified arrangement, the length of strip material fed into the sizing and forming station B depends entirely upon the relative location of the stop plate 62 and the cutting blade 64, as the end of the strip material 14 is urged into engagement with the stop plate 62 by springs 37 and 37a whenever the cutting blade 64 is lifted as shown in FIG. 8. Hence, if it is desired to change the length of strip pieces 70 to be formed, it is merely necessary to relocate or reposition the stop plate 62 and the cutting blade 64 with respect to one another. Furthermore, it will be understood that a sufficient amount of the strip material 14 is supplied into the accumulating and feed device 34 when the supply rolls 38, 40 are energized to produce several strip pieces 70 and therefore several slot liners 10, and that the supply rolls 38, 40 will only be periodically energized as the proximity switch 35 is switched on by the device 34.

In accordance with the exemplification, the rack section 84 is attached to a vertically reciprocable carriage 85 (see, e.g., FIG. 10) which has mounted in cantilever fashion on the upper ends thereof on arms 85a and 85b a horizontally extending supporting plate 87. The forward end of the supporting plate 87 lies under the forward end of a rocker assembly 91 including rocker arms 92 and 93 rotatably mounted on a rocker shaft 93a that is supported between stationary uprights 94 and 95 forming a portion of a stationary supporting frame 97. Stops 98 and 98a at the forward ends of the arms 92 and 93 respectively engage cut-out portions 98c, 98d in the uprights 94 and 95. Coil springs 96 and 96a are mounted under the rear ends of the rocker arms 92 and 93 respectively, and urge the assembly in a counterclockwise direction (as seen, e.g., in FIG. 1). When the supporting plate 87 is carried upwardly by the carriage 85 as previously described, it will engage the rocker assembly and rotate it in a clockwise direction against the force of springs 96 and 96a.

As will be seen in FIGS. 1, 9 and 15, the cutting blade 64 is mounted in a generally L-shaped subassembly 111 which includes a lower leg 112 having a strip material slot 118 therein. The cutting blade 64 is mounted under the forward end of the rocker assembly arms 92 and 93 and reciprocably mounted on the other leg 114 of the subassembly 111. Thus, as will be seen in FIG. 15, the cutting blade 64 and a back plate 115 are disposed on opposite sides of the leg 114 and connected through elongate slots 116, 116a in the leg 114 by suitable connecting means. Mounted in the slots 116, 116a in the leg 114 are small springs (not illustrated) which normally urge the cutting blade 64 and the plate 115 in an upward direction. It will be understood that when the carriage 85 moves upwardly, the plate 87 will cock or rotate the rocker assembly in a clockwise direction (e.g., FIG. 1) with the blade 64 following the rocker arms 92 and 93 upwardly due to the springs and with the strip material 14 feeding up to the stop plate 62 as previously described, and after the dwell period, the carriage 85 moves downwardly, wherein the rocker arms 92 and 93, which engage the upper end of the cutting blade 64, will force the cutting blade 64 downwardly thereby severing the strip material 14 to form the strip piece 70.

The previously mentioned slot liner placing mechanism 60 is provided for placing the strip piece 70 upon the forming blade or tool 80 to shape or effect a desired configuration thereof. This placing mechanism 60 is a subassembly which is mounted to the underside of the supporting plate 87 (see FIGS. 9 and 11) and hence moves therewith. Referring further to FIGS. 9 and 11 as well as to FIGS. 12 and 13, it will be seen that the placing mechanism 60 comprises a pair of slotted plates 67 and 68 spaced apart by a spacer block 69 having mounting openings 69a for mounting to the plate 87. The slotted plates 67 and 68 define a slot 71 therebetween that is open at the lower ends of the plates. The previously mentioned pressure bar 135 is carried in the slot 71 on pins 72 that ride in the plate slots 73. The pressure bar 135 has a lower face 74 shaped to conform to the upper face or surface 80b of the forming tool 80, with a spring biased member 85 between the pressure bar 135 and the spacer block 69 for maintaining the pressure bar 135 in engagement with the forming tool 80 when the placing means 60 is moved downwardly with the carriage 85 and supporting plate 87.

When the carriage 85 moves downwardly, and immediately after the cutting blade 64 severs the strip material 14 to produce a strip piece 70, the supporting plate 87 will carry the spaced apart slotted plates 67 and 68 over the forming tool 80 which is disposed in vertical alignment with the slot 71. The spaced apart plates 67 and 68 will be effective thereby to place the strip pieces 70 into engagement with the forming tool 80, and as the carriage 85 continues downwardly the lower face 74 of the pressure bar 135 will engage the strip piece 70 tightly against the upper face or surface 80b of the forming tool 80, forcing the strip piece 70 to take the shape of this upper face 80b. In addition, as the carriage 85 moves downwardly, the flat lateral extensions or cuff-like portions 88 and 88a are formed by the cooperation between cuff forming means 107 on the slotted plates 67 and 68 and mating cuff forming means 109 on the forming tool 80. Front and rear springs 135a, 135b between the pressure bar 135 and frame 66 tend to maintain the bar level and the pins 72 towards the bottoms of slots 73.

Referring again to FIGS. 11–13, it will be seen that the cuff forming means 107 comprises a pair of inwardly directed legs 117 and 119 at the lower edges of the slotted plates 67 and 68 respectively. The legs 117, 119 have rear vertical edges 123, 123a respectively which engage in respective notches 125, 125a in the mating cuff forming means 109. The strip material 14 is fed into the sizing and forming station B so that the crease 14c of the strip piece 70 is aligned between the vertical edges 123, 123a and the notches 125, 125a. Hence, when the placing mechanism 60 is moved downwardly over the forming tool 80, the strip piece is folded along the crease 14c producing the lateral extensions 88 and 88a, and the axial extension 89, as shown in FIG. 12. These lateral extensions or flat cuff-like portions 88, 88a not only provide the aforementioned advantages, but also permit the strip piece 70, which is engagingly placed upon the forming tool 80 to form a strip piece having a desired configuration, to be easily carried with the blade 80 into a stator slot 90 as the legs 109a, 109b of the cuff forming means 109 can push against the extensions 88 and 88a.

The pressure bar 135 has a head portion 77 at its forward end including a pair of vertical plates 78a and 78b. The plates 78a and 78b are loosely pinned to the pressure bar 135 at their rear ends by slidable top and bottom pins 136 and 136a, and biased towards the pressure bar 135 at their front ends by springs 79a, 79b carried on spring pin 79c. Plates 78a, 78b extend below the lower face 74 of the pressure bar 135 and form an opening 78g therebetween generally conforming to the shape of the forming tool 80. This head portion 77 will normally engage or at least be in close proximity to the end face 12a of a stator core 12 mounted on the mandrel 130, with the opening 78g being in axial alignment with a preselected slot 90 of the stator core 12. In order to hold the strip piece 70 carried on a tool such as the exemplified tool 80, tightly against the tool sides, e.g., to compress it, so as to enable it to fit into an aligned core slot, the plates 78a and 78b have inwardly disposed portions 78c and 78d forming inwardly disposed camming surfaces 78e and 78f respectively. Thus, when the forming tool 80 having a strip piece 70 wrappingly engaged thereon is inserted toward a stator slot 90, the surfaces 78e and 78f will force the strip piece tightly against the forming tool 80, holding the strip piece on the tool 80 externally of the core and permitting the strip piece 70 to pass into the slot 90 while effectively maintaining it on the tool 80 and preventing it from becoming misaligned as it is carried into the slot. In addition, in order to release the strip piece when at least a portion of the strip piece is in the slot 90, as the tool 80 continues into the slot 90, the cuff forming legs 109a, 109b will engage the camming surfaces 78e and 78f, forcing the plates 78a and 78b apart as shown in particular in phantom lines in FIGS. 11 and 13. This will release the strip pieces from their engagement by the plates 78a and 78b and permit the strip piece to remain in the slot 90 as the tool 80 is withdrawn.

Since the forming tool 80 is, of necessity, smaller than the slot 90 into which it is to be inserted, and since it is desirable that the slot liner formed from the strip piece 70 fully line the walls of each slot 90 of the core 12, the upper face 87 of the forming tool 80 has a longitudinally extending groove 80a therein into which a portion of the strip piece 70 is forced by the pressure bar 135. When the forming tool 80 is withdrawn from the slot 90, a deformed slot liner 10 carried on the tool 80 will thereby snap apart or expand, engaging the entire inner wall or periphery of the slot, thereby fully lining the slot and also helping to keep the liner in the slot as the forming tool is withdrawn.

The stationary supporting frame 97 also includes an elongate slot 134 therein in which the aforementioned bar cam 194 is slidably received. As will be seen in FIGS. 1 and 15, the bar cam 194 includes two camming sections 335 and 336 thereon with each camming section having three cam positions. The camming section 335 acts with a cam follower 137 that is connected to the stop plate 62, and the other cam section 336 acts with a cam follower 138 that is connected to the subassembly 111. The bar cam 194 is connected through the linkage 190 to the aforementioned oscillating shaft 170, and hence when the shaft oscillates to carry a forming tool (80, 81 or 82) into position adjacent the strip placing means 60, the bar cam 194 will be moved in order to provide a predetermined distance between the stop plate 62 and the cutting blade 64 corresponding to the desired length of the strip piece 70 to be produced.

Referring again to FIG. 15, it will be seen that the subassembly 111 is slidably mounted, at 200, on the cam follower 137 and attached to the cam follower 138, at 202, while the stop plate 62 is slidably mounted on the cam follower 138, at 204, and attached to the cam follower 137, at 206. It will also be seen that the two cam followers 137, 138 are slidably mounted at their rear ends in openings 210 and 212 respectively in the frame 97. The cam sections 335 and 336 are shaped with three corresponding positions each, so that the cam followers 137, 138 may move to one of three positions as the bar cam 194 is moved, and hence the stop plate 62 and cutting blade 64 are moved relative to each other to provide one of three predetermined distances therebetween. This is necessary so that the strip pieces 70 that are cut will correspond in length to the size of slot 90 in the stator 12 to be lined, and of course, to the forming tool (80, 81 or 82) then located adjacent the station or mechanism to receive the strip piece 70. In order that the cam followers 137 and 138 will engage their cam sections 335 and 336 respectively, a compression spring 214 is mounted between the stop plate 62 and the frame 97 urging the stop plate 62 and follower 137 towards the bar cam 194. Also, a compression spring 216 and connecting pin 218 are mounted between the subassembly 214 and frame 97 for urging the subassembly 111 and follower 138 towards the bar cam 194.

Accordingly, from the foregoing description of the sizing and forming station B, it will be appreciated that the strip material 14 which is fed therein is automatically sized, cut and placed upon a given preselected forming tool in the vicinity of the sizing and forming station for insertion into an aligned core slot 90. The sizing feature is accomplished by the cooperation between the accumulating and urging device 34, the stop plate 62 and the cutting blade 64 by a relatively simple yet effective mechanism which operates in synchronism with other operating components and mechanisms of the apparatus.

Inserting Station (C)

In accordance with the exemplification, as shown in FIGS. 1, 10, 11 and 14, an inserting mechanism 100 is provided for inserting the various forming tools 80, 81 and 82 axially into aligned slots (90a, 90b, 90c) of the magnetic core 12 seated on the mandrel 130. The previously mentioned carriage 102 is mounted on guide rods 106 and 108 and is movable between a forward and rear position by the linkage 110 which is connected in turn to the idler shaft 163 and to the driving cam 161 on the master control shaft 120. The linkage 110 includes first and second bell crank type links or arms 110a and 110b connected by straight links 110c and 110d. The arm 110a has a slot 110e therein to permit adjustment of the stroke of carriage 102. Thus, a simple adjustment of link 110d in slot 110e will permit different lengths of slot liners 10 to be inserted in cores having different stack heights. However, this adjustment need only be made for cores that vary considerably from the average, since the tool 80 will normally travel through and beyond a core mounted on the mandrel 130 during the insertion of a slot liner 10 (as shown for example in FIG. 7).

It will be understood by viewing FIGS. 1 and 16 that during each revolution of the master control shaft 120 the idler shaft 163 will turn in a first direction causing the tool 80 to be inserted into a slot 90, and will then thereafter turn back to withdraw the blade 80. As illustrated by curve c in FIG. 16, carriage 102 will remain stationary or dwell as the strip material 14 is fed, severed and placed upon the tool 80 and will then move forwardly to insert the tool 80 into a slot and will immediately return, withdrawing the tool 80.

In order for the carriage 102 to carry the various forming tools therewith during its movement, the aforementioned connecting block or leg 124 is provided. Referring to FIGS. 9 and 14, it will be seen that the leg 124 is mounted in a carrier 220 that is connected to the carriage 102. As will be seen in these figures, the carrier 220 includes a generally cross-shaped member 222 having a vertical portion 224 and a horizontal portion 226. The vertical portion 224 has a slot 228 thereon in which the leg 124 is reciprocably mounted. The leg 124 is normally biased downwardly into the notch 126 in a forming tool (e.g., tool 80) by a compression spring 230 mounted between a pin 232, connected to the member 222 and the bottom of a slot 234 in leg 124. During the normal operation of the apparatus, the leg 124 will be seated in the notch 126 in one of the forming blades (80, 81 or 82) to carry the blade into a stator slot 90 (see, e.g., FIG. 1 wherein it will be seen that each forming blade has a notch 126 therein, and understood that as the blade assembly 180 rotates to present the appropriate blade in an insertion position, its notch 126 will engage the leg 124).

Provision has been made to prevent damage to the apparatus in case a forming tool should sense a defective stator core by meeting an obstruction in a core slot. Thus, the cover plate 236 of the carrier 220 has an opening 238 therein having an inclined edge 240 forming a camming means. The leg 124 has a pin or follower 242 thereon normally seated at the lower end of inclined edge 240. However, if the forming tool (e.g., tool 80 in FIG. 14) should meet with an obstruction while the carriage 102 is moving forwardly, the pin 242 will ride up the edge 240 pulling the leg 124 out of the slot 126 thereby preventing damage to the tool as well as the remainder of the apparatus. Further, a hold down leg 244 is provided for the blade 80 to prevent the blade from rising out of the annular members 182a, 182b and 182c in such a case. In order to turn off the apparatus and to indicate that the blade has become disengaged from the leg 124, a normally closed cut-off or limit switch 246 is provided along with a pivotally mounted actuating mechanism 248 having an arm 250 disposed over the leg 124 and a switch actuating arm 252 disposed over the switch 246. Hence, when the leg 124 rises in the member 222, the arm 252 will contact the switch 246 shutting off the drive motor 48. At this time, it will, of course, be necessary for an operator to remove the defective stator and restart the apparatus.

With reference again to the heretofore mentioned forming blades or tools 80, 81 and 82, one of these forming blades is always supported adjacent the forming mechanism 60 with the other two blades in the exemplification ready to be indexed into position to receive a piece of electrically insulating strip material 70 thereon. The three forming blades 80, 81 and 82 of the exemplification are shaped to correspond generally to the three differently shaped core slots 90a, 90b and 90c in the exemplified stator core. However, if a stator core having more than three differently shaped slots is to be mounted on the mandrel 130, it is merely necessary to add additional forming tools to the assembly 180, and to change the cam 158 in order to control the rotation of the blade assembly 180 and to change the preselected distances between the stop plate 62 and cutting blade 64.

Indexing Station (D)

The stator core 12 is mounted upon the mandrel 130 located adjacent the sizing and forming station B and the mandrel must be moved relative to the blade assembly 180 to locate the core slots in position to receive slot liners thereon. Thus, the mandrel shaft 132 having the spur gear 157 mounted on the rear end thereof is connected in the gear train including the aforementioned spur gears 156, 155 and 154 and the Geneva cam mechanism 152 to the master control shaft 120. The shaft 132 will therefore rotate through a predetermined increment as determined by the four gears 154–157 during a predetermined quarter of the revolution of the master control shaft 120, as shown by curve a in FIG. 16 which incidentally represents the motion of bar cam 194 and its followers 137, 138, the mandrel 130 rotation, the movement of blade assembly 180, and the feeding of strip material 14 to the stop plate 62, all of which take place during the same portion of revolution of shaft 120, during dwells in curves b and c.

In the exemplification, inasmuch as the exemplified stator core 12 has four poles, each with six slots, or a total of 24 slots, the shaft 132 and mandrel 130 will rotate one twenty-fourth of a revolution during each cycle or rotation of the master control shaft 120 in order to present each of the 24 slots in turn in position to receive a slot liner 10 therein. It is relatively simple to change the increment of revolution of the shaft 132 and mandrel 130 if it is desired to develop slot liners 10 in a core having fewer or greater than 24 slots, as one merely has to change two or more of the four gears 154–157 of the gear train. As will be seen in FIGS. 10 and 11, these four gears 154–157 are located externally of the apparatus housing 66, and hence are readily accessible for being changed.

In order to stop the apparatus when the slots of a stator core (such as core 12) have been filled with slot liners 10, first and second proximity switches 260 and 262 have been provided at the indexing station D. The proximity switch 260 is disposed adjacent the gear 123 on master control shaft 120, and the gear 123 has a switch actuator 261 thereon. Thus, as the gear 123 rotates once each time the shaft 120 rotates, the actuator 261 will pass the switch 260 for actuating it once each revolution of shaft 120. However, the electrical circuitry (not specifically illustrated) is arranged so that the motor 48 will be shut off by switches 260 and 262 only when both are actuated simultaneously (as, for example, by a conventional "and" circuit). The switch 262 is disposed adjacent the spur gear 157 which in the exemplification rotates only one twenty-fourth of a revolution for each revolution of the master control shaft 120. The gear 157 has a switch actuator 263 which will, therefore, actuate switch 262 only once in 24 revolutions in master control shaft 120, when all the slots 90 of the stator 12 are lined, and the motor 48 will be automatically turned off when the slot liners are developed in the core slots.

I have, in the actual practice of my invention with the illustrated apparatus, developed slot liners in stator cores having between 16 and 36 slots. These stators have varied stack heights, bore diameters, and have from one to nine different slot configurations or shapes. While the illustrated apparatus will handle graded slot cores having up to three different slots, it will be understood that additional slot shapes may be handled merely by adding more tools to the tool assembly 180. In addition, it will be appreciated that while I have illustrated the present invention in conjunction with stator cores, the invention is also useful for developing electrical insulators in magnetic cores other than stator cores. Taking rotor or armature cores, by way of illustration, the rotor core may be supported with its longitudinal axis offset from the center of rotation of mandrel 130, so as to locate the rotor slots in correct position relative to the forming tools. An expandable collet or other suitable supporting devices could readily be added to the present apparatus for holding a rotor core in such correct position.

In view of the foregoing, it will be understood that the present invention is extremely versatile in that magnetic cores having various stack heights and overall sizes, various numbers of slots, and various slot configurations may have electrical insulators developed therein. In this regard with specific reference to stator cores and slot liners, I have found it possible to set up from one type to another type stator core within 10 to 15 minutes. For example, to accommodate stator cores having different bore sizes, it is merely necessary to change the mandrel 130, to accommodate stator cores having different numbers of slots, it is merely necessary to change the one or more of the gears 154–157 and the cam 158 which are readily accessible and readily slip off their various mounting shafts. In order to provide for different slot configurations, it is merely necessary to add or change the forming tools, which may be accomplished merely by lifting the tools out of the tool assembly 180 and placing other tools therein.

Other extremely desirable features, which may be beneficial for use in some applications include mandrel 130 that is accurately dimensioned to provide a gauge for proper bore size and shape, the connecting leg 124 that is movable to shut off the motor 48 and to indicate a defective stator if a slot is obstructed, and the tools that carry the slot liners directly into the core slots rapidly and with a great degree of consistency and accuracy. Additional desirable features relate to the electrical insulators which are produced with accurate dimensions and hence fit the core slots well, and that several varieties of cuffs may be provided. In addition, a short coil end turn height or effective mean length for the end turns is permitted.

Consequently, while in accordance with the Patent Statutes, I have described what at present are considered to be the preferred forms of my invention it will be obvious to those skilled in the art that numerous changes and modifications may be made therein without departing from the true spirit and scope of the invention, and it is therefore aimed in the following claims to cover all such modifications.

What I claim as new and desire to secure by Letters Patent of the United States is:

1. A slot insulator for insulating a slot wall and a portion of at least one end face of a magnetic core having axially extending slots terminating in edges at end faces from a coil of electrically conductive wire carried in a slot, comprising: a piece of electrically insulating strip material of a sufficient size to line the slot walls and to extend beyond at least one end face of the magnetic core, at least one edge of the piece being turned outwardly thereby forming laterally extending portions adapted to lie flat against at least one end face of the magnetic core, and an intermediate portion between said laterally extending portions extending in an axial direction beyond the laterally extending portions, and curved connector portions integrally joining the laterally extending portions and the intermediate portion to form a continuous surface whereby a section of the coil adjacent the edges of the slot is caused to take a gradual bend.

2. An arrangement of a magnetic core having a plurality of slots therein extending between a pair of end faces, and slot insulators for insulating walls of slots in the core, the arrangement including: a plurality of slot insulators each comprising a piece of electrically insulating material disposed in a slot of the core; at least one of the pieces of electrically insulating material being preselected to line the walls of a predetermined one of the core slots and to extend beyond at least one end face of the magnetic core; at least one edge of said at least one of the pieces of electrically insulating material being turned outwardly thereby to form laterally extending portions adapted to lie flat against the at least one end face of the magnetic core; said at least one of the pieces of electrically insulating material including an intermediate portion between said laterally extending portions extending in an axial direction beyond the laterally extending portions, and curved connector portions integrally joining the laterally extending portions and the intermediate portion to form a continuous surface whereby a section of a coil, adjacent the edges of the core slot in which the at least one piece of electrically insulating material is disposed, is caused to take a gradual bend.

3. The arrangement of claim 2 wherein at least two of the slot insulators are differential configured, with each of said at least two of the slot insulators being configured to fit in a core slot of a predetermined size and shape.

* * * * *